United States Patent Office 3,288,807
Patented Nov. 29, 1966

3,288,807
DIPHOSPHORANYLIDENEAMINO DERIVATIVES OF MALEIMIDES
William Lindsay Mosby, North Plainfield, N.J., assignor to American Cyanamid Company, Stamford, Conn., a corporation of Maine
No Drawing. Filed Nov. 6, 1964, Ser. No. 409,608
3 Claims. (Cl. 260—326.5)

This invention relates to a new class of organo-phosphorus compounds and to a method of preparing them. More particularly, it relates to diphosphoranylideneamino derivatives of maleimides of Formula I:

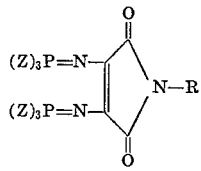

wherein R is alkyl (especially lower alkyl), aryl (such as phenyl, naphthyl and biphenyl) and heterocyclic radicals (such as pyridyl, furyl, piperidyl, etc.), and Z is alkyl, aryl, alkoxy, alkenoxy and aralkoxy. The aryl groups may be substituted by inert substituents such as alkyl, alkoxy, halo, nitro and alkanamido (e.g., acetamido).

The compounds of Formula I are useful as fluoroescent pigments.

The compounds (I) of this invention are prepared by reacting a diazido-maleimide (II) with two moles of a trivalent phosphorus compound (i.e., an alkyl- or arylphosphine or an ankyl phosphite). The reactions are carried out in an inert solvent.

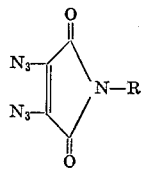

Reactions are carried out advantageously at a temperature between −100° and about 25° C.

After the reaction is completed, the products are isolated by evaporation or distillation of the solvent, washing the residue with methanol, benzene or other suitable liquid. If desired, the product may be purified by chromatography or recrystallization.

The diazido-maleimides are prepared by the procedures described in J. Am. Chem. Soc. 78, 145 (1956) and Tetrahedron 19, 1591 (1963).

Among the diazido-maleimides which may be used to prepare the compounds of this invention are:

2,3-diazido-N-methylmaleimide,
2,3-diazido-N-ethylmaleimide,
2,3-diazido-N-n-butylmaleimide,
2,3-diazido-N-phenylmaleimide,
2,3-diazido-N-o-tolylmaleimide,
2,3-diazido-N-2,4-xylylmaleimide,
2,3-diazido-N-p-methoxyphenylmaleimide,
2,3-diazido-N-p-propoxy-phenylmaleimide,
2,3-diazide-N-p-chlorophenylmaleimide,
2,3-diazido-N-p-bromophenylmaleimide,
2,3-diazido-N-p-fluorophenylmaleimide,
2,3-diazido-N-p-nitrophenylmaleimide,
2,3-diazido-N-p-acetamidophenylmaleimide,
2,3-diazido-N-p-biphenylylmaleimide,
2,3-diazido-N-1-naphthylmaleimide,
2,3-diazido-N-2-naphthylmaleimide,
2,3-diazido-N-(4-nitro-1-naphthyl)maleimide,
2,3-diazido-N-2-pyridylmaleimide, etc.

The alkylphosphines which may be used include trimethylphosphine, triethylphosphine and tributylphosphine. The arylphosphines which may be used include those in which the aryl moiety is carbocyclic and has less than three 6-membered rings including: triphenylphosphine, tri-1-naphthylphosphine, tri-2-naphthylphosphine, dimethylphenylphosphine, dihexylphenylphosphine, diethyl - 2-napthylphosphine, methyldiphenylphosphine, vinyldiphenylphosphine, diallylphenylphosphine and divinyl-2-naphthylphosphine. The phosphites which may be used include alkyl phosphites, especially those wherein the alkyl groups have no more than 18 carbons including: trimethylphosphite, triethyl phosphite, tricyclohexyl phosphite, trioctyl phosphite, trioctadecyl phosphite; alkenyl phosphites, especially those having no more than 18 carbons in each alkenyl group, including: trivinyl phosphite, triallyl phosphite and trioleyl phosphite; aralkyl phosphites, especially those wherein the aralkyl moiety is a mono- or bicyclic ar(lower)alkyl radical including: tribenzyl phosphite, tri(2-phenylethyl) phosphite, tri(2-naphthylmethyl) phosphite, dimethyl benzyl phosphite and phenyl bis(6-phenylhexyl) phosphite.

*Example 1.—N-phenyl-2,3-bis[(triphenylphosphoranylidene)amino]-maleimide*

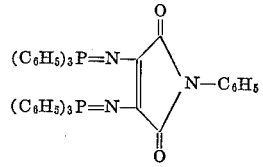

A solution of 2.63 g. of triphenylphosphine in about 25 g. of methylene chloride is added dropwise to a chilled solution of 2,3-diazido-N-phenylmaleimide (1.27 g.) in about 40 g. of methylene chloride. The solvent is removed by evaporation, and the residue is washed with methanol and then with benzene. The dark red product is crystallized from benzene, melting point 257–258° C.

*Analysis.*—Calc. for $C_{46}H_{35}N_3O_2P_2$: C, 76.4; H, 4.83; N, 5.81; O, 4.42. Found: C, 76.0; H, 4.97; N, 5.81; O, 4.16.

The corresponding tris(p-nitrophenyl)phosphine, tris-(p-chlorophenyl)phosphine, tris(p-tolyl)phosphine, tris(p-methoxyphenyl)phosphine and tris(p-acetamidophenyl)phosphine can be substituted in the foregoing procedure to yield the correspondingly substituted maleimides.

Similarly, the N-methyl analog of the compound of Example 1 can be obtained by using 2,3-diazido-N-methylmaleimide in place of that used in Example 1.

*Example 2.—N-phenyl-2,3-bis[(trimethoxyphosphoranylidene)amino]-maleimide*

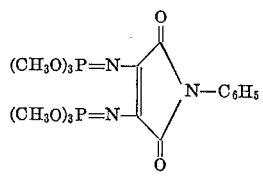

A solution of 2.7 g. of trimethylphosphite in about 35 g. of methylene chloride is added dropwise to a solution of 2.5 g. of 2,3-diazido-N-phenylmaleimide in about 200 g. of methylene chloride. After stirring for about one hour, the solvent is removed by evaporation and the residue is dissolved in benzene. The product is separated from the benzene solution by chromatographic procedures. The product is a yellow-gold solid melting at 75–85° C.

*Analysis.*—Calc. for $C_{16}H_{23}O_8N_3P_2$: C, 43.0; H, 5.14;

N, 9.4; P, 13.9. Found: C, 42.7; H, 5.30; N, 9.22; P, 13.6.

I claim:

1. A compound of the formula:

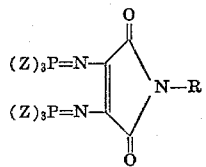

wherein R is lower alkyl, naphthyl, nitronaphthyl, or phenyl having up to two substituents selected from the group consisting of lower alkyl, lower alkoxy, halo, nitro and lower alkanamido; naphthyl or nitronaphthyl; and Z is lower alkyl, phenyl, naphthyl, lower alkenyl, alkoxy of up to 18 carbons, alkenoxy of up to 18 carbons or benzyloxy.

2. N - phenyl - 2,3-bis[(triphenylphosphoranylidene)-amino]-maleimide.

3. N - phenyl-2,3-bis[(trimethoxyphosphoranylidene)-amino]-maleimide.

References Cited by the Examiner

Sedgwick: Organic Chemistry of Nitrogen (1937), page 374.

ALEX MAZEL, *Primary Examiner.*

HENRY R. JILES, *Examiner.*

JOSEPH A. NARCAVAGE, *Assistant Examiner.*